United States Patent
Colbath

(10) Patent No.: US 7,653,737 B2
(45) Date of Patent: *Jan. 26, 2010

(54) SYSTEM AND METHOD FOR COMMUNICATION OF STREAMING DATA

(75) Inventor: Mark Allan Colbath, Bedford, TX (US)

(73) Assignee: Spotware Technologies, Inc., San Diego, CA (US)

( * ) Notice: Subject to any disclaimer, the term of this patent is extended or adjusted under 35 U.S.C. 154(b) by 1379 days.

This patent is subject to a terminal disclaimer.

(21) Appl. No.: 10/783,658

(22) Filed: Feb. 20, 2004

(65) Prior Publication Data

US 2004/0205222 A1    Oct. 14, 2004

Related U.S. Application Data

(63) Continuation of application No. 09/385,142, filed on Aug. 27, 1999, now Pat. No. 6,728,776.

(51) Int. Cl.
*G06F 15/173* (2006.01)
*H04N 7/173* (2006.01)

(52) U.S. Cl. .................... 709/231; 725/96

(58) Field of Classification Search .............. None
See application file for complete search history.

(56) References Cited

U.S. PATENT DOCUMENTS

| | | | | | |
|---|---|---|---|---|---|
| 5,586,264 | A | * | 12/1996 | Belknap et al. | 725/115 |
| 5,600,366 | A | * | 2/1997 | Schulman | 725/36 |
| 5,761,417 | A | * | 6/1998 | Henley et al. | 709/231 |
| 5,822,537 | A | * | 10/1998 | Katseff et al. | 709/231 |
| 5,996,015 | A | * | 11/1999 | Day et al. | 709/226 |
| 6,249,810 | B1 | * | 6/2001 | Kiraly | 709/217 |
| 6,317,761 | B1 | * | 11/2001 | Landsman et al. | 715/205 |
| 6,317,784 | B1 | * | 11/2001 | Mackintosh et al. | 709/219 |
| 6,377,972 | B1 | * | 4/2002 | Guo et al. | 709/201 |
| 6,411,992 | B1 | * | 6/2002 | Srinivasan et al. | 709/218 |
| 6,434,621 | B1 | * | 8/2002 | Pezzillo et al. | 709/231 |
| 6,457,025 | B2 | * | 9/2002 | Judson | 715/201 |
| 6,463,468 | B1 | * | 10/2002 | Buch et al. | 709/219 |
| 6,567,842 | B2 | * | 5/2003 | De Leo et al. | 709/200 |
| 6,625,655 | B2 | * | 9/2003 | Goldhor et al. | 709/231 |
| 6,698,020 | B1 | * | 2/2004 | Zigmond et al. | 725/34 |

* cited by examiner

*Primary Examiner*—Aaron Strange
(74) *Attorney, Agent, or Firm*—Pearne & Gordon LLP

(57) ABSTRACT

A system and method for the communication of streaming data is disclosed. In an exemplary method of the present invention, a first set of data is received by an information handling system. A second set of data is received via a network wherein the second set of data is continuously streaming. During times when a sufficient amount of streaming data of the second set of data is available for communication, the second set of data is communicated to a user. Otherwise, the first set of data is communicated to the user. In one embodiment, the second set of data may include a video stream viewable by a user. In another embodiment of the present invention, the first data set and the second data set may be transmitted from a first source. In yet another embodiment, during the time that a first set of data is being communicated due to a presently insufficient amount of streaming data of the second set of data, the second set of data may be monitored such that when a sufficient amount of streaming data is available, the second set of data is communicated.

39 Claims, 7 Drawing Sheets

SYSTEM AND METHOD FOR COMMUNICATION OF STREAMING DATA

CROSS REFERENCE TO RELATED APPLICATION

The present invention claims priority, as a continuation type application, under 35 U.S.C. §120 to the U.S. patent application Ser. No. 09/385,142, filed Aug. 27, 1999, now U.S. Pat. No. 6,728,776, which is currently under a Notice of Allowance. The U.S. patent application Ser. No. 09/385,142, is herein incorporated by reference in its entirety.

FIELD OF THE INVENTION

The present invention generally relates to the field of data transfers, and particularly to the communication of streaming data.

BACKGROUND OF THE INVENTION

Resource networks and, more particularly, the Internet and World Wide Web, offer a wider range of resources with each passing day. Online concerts, talk sessions, simulcasts, and other broadcasts have become increasingly more common. Given the direction of Internet technology, it may be possible to receive video programming directly over the Internet as opposed to a television broadcast. This may allow a viewer to choose programming as desired. However, even though connection speeds may continue to increase (connection speeds have already made significant improvements over speeds that even recently were deemed impressive), it is foreseeable that problems may continue with interruptions and data transfer slow downs. Problems with connections, throughput rates, line interference, etc. may cause interruptions and delays in the transfer of data. The time during which the data transfer is interrupted or slowed may result in blank screens and/or indecipherable output. A user must then wait for restoration of the connection so that enough data may be transmitted to the user's system, therein enabling communication to resume.

To utilize streaming data (e.g., data that is transmitted in a fairly continuous series is one type of streaming data), it is necessary to have a sufficient amount of data present in a user's information handling system for processing. Therefore, data must be transmitted at a sufficient rate or quantity so as to provide sufficient amounts of data to be utilized by the system. Buffering data such that inconsistencies in the streaming rate or quantity of streaming data will not affect the utilization of the data, is one way to address this problem. However, in some instances the buffer may not store sufficient data to cover the inadequacy of the transmission, such as a lack of throughput rate. For instance, a large quantity of data may be needed for communicating a data stream that includes video programming. This may require a large buffer that would further result in an extended waiting period as the buffer is filled before utilization. Additionally, the buffer may not be fully responsive to varying throughput rates, resulting in inconsistent communication of the streaming data. Therefore, it may be desirable to utilize another set of data so as to disguise the lack of sufficient amounts of streaming data currently available.

Other methods for addressing nonproductive times in an information handling system prove inadequate when addressing the communication of streaming data. Most of these methods merely address waiting periods for a system to perform a task, not the dynamic problems associated with transmission of data streams that may be utilized as it is being transmitted. Often, these methods rely on the initiation of an event, such as the initiation of a link to perform the desired action. In some instances, actions taken before and after the necessary event are not capable of utilizing the method. Additionally, in another method, the displayed information must have been previously stored on the system. These methods may not provide for the supply of data images during interruptions or slowdowns in the transfer of the data, nor provide for the viewing of the data as it is downloaded so that a user may interact with a data stream. Rather, these methods merely respond to the initiation of an action.

Therefore, there is a need for a system and method for communication of a stream of data that addresses a potential lack of sufficient amounts of streaming data.

SUMMARY OF THE INVENTION

The present invention is directed to a system and method for the communication of streaming data. In an exemplary method of the present invention, a first set of data is received by an information handling system. A second set of data is received via a network wherein the second set of data is continuously streaming. So long as a sufficient amount of streaming data of the second set of data is available for communication, the second set of data is communicated to a user. Otherwise, the first set of data is communicated to the user. In an exemplary embodiment, the second set of data includes a video stream viewable by a user. In another embodiment of the present invention, the first data set and the second data set may be transmitted from a first source. In yet another embodiment, when a first set of data is being communicated due to a presently insufficient amount of streaming data of the second set of data, the second set of data may be monitored such that when a sufficient amount of streaming data is available, the second set of data will be communicated.

It is to be understood that both the forgoing general description and the following detailed description are exemplary and explanatory only and are not restrictive of the invention as claimed. The accompanying drawings, which are incorporated in, and constitute a part of, the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to presently preferred embodiments of the present invention, examples of which are illustrated in the accompanying drawings.

Referring now generally to FIGS. 1-9, a system and method for communicating streaming data will be discussed. To utilize streaming data, such as data that is transmitted in a fairly continuous series, it may be necessary to have a sufficient amount of data available to a user's information handling system for processing. Therefore, data must be transmitted at a sufficient rate or quantity so as to provide sufficient amounts of data to be utilized by the system. When there are insufficient amounts of streaming data, communication of the available data may result in incomplete and incomprehensible output. Insufficient amounts of streaming data may result from slow transmission rates, insufficient processing resources, interference with a connection between a user's system and a provider system, termination of a connection between a user's system and a provider system, lowered throughput rates, etc. Therefore, it may be desirable to utilize another set of data so as to disguise the lack of sufficient amounts of streaming data.

Figure 1:
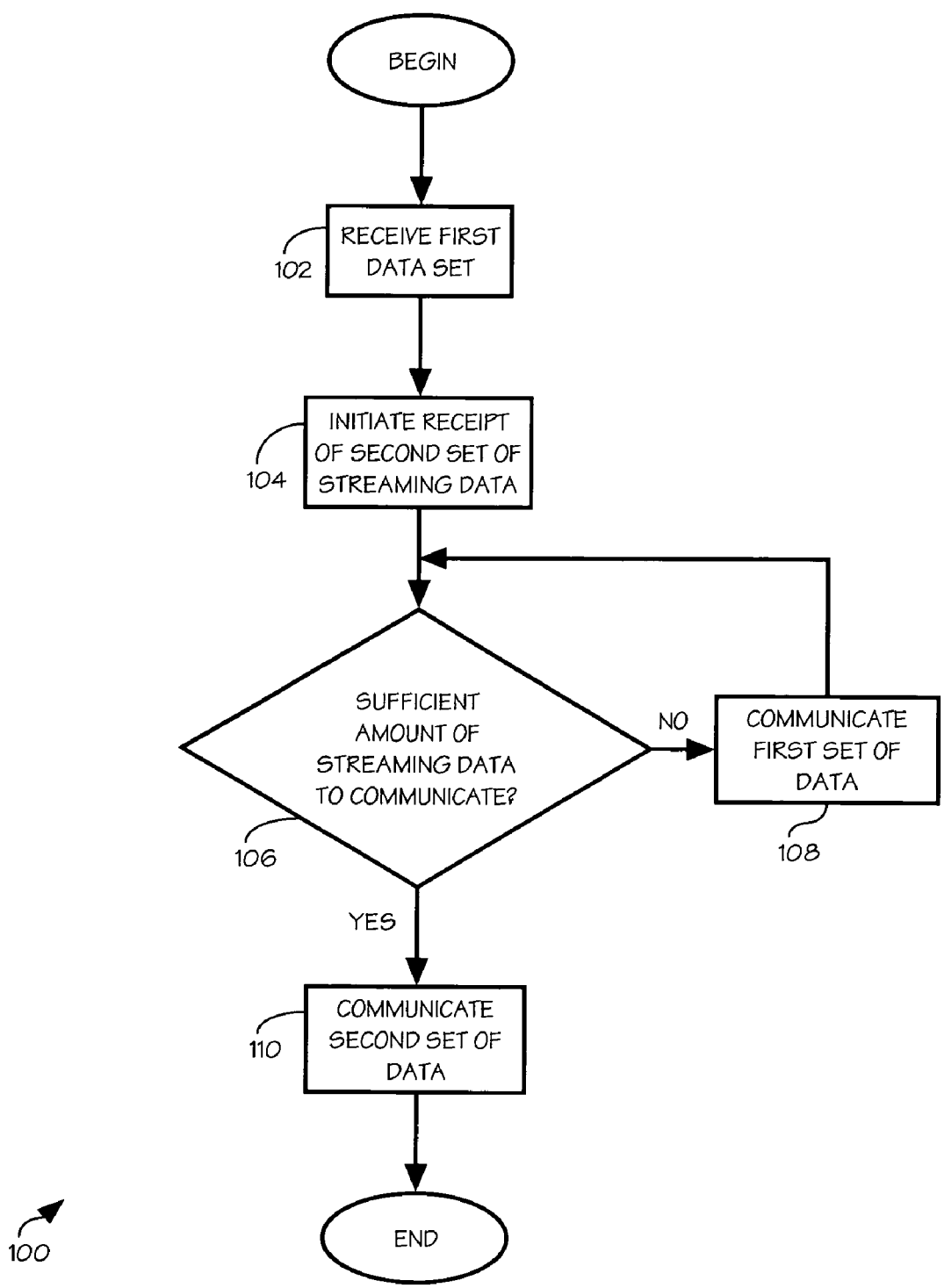
FIG. 1 is a flow chart depicting an exemplary method of streaming data according to the present invention.

Referring now to FIG. 1, a flow chart of an exemplary method of streaming data according to the present invention is shown. In this embodiment, a method 100 may involve a variety of types of streaming data, such as video programming, traditionally shown on a television, live netcasts over the Internet, interviews transmitted over a network, video conferencing, etc. An information handling system may receive a first data set 102 and then initiate the receipt of a second set of streaming data 104 over a network. A network may include a local area network (LAN), a wide area network (WAN), online service, Internet, World Wide Web, satellite systems such as a digital satellite system, wireless systems such as a personal communication system, etc. The information handling system may then determine if there is a sufficient amount of streaming data to communicate 106 the data. If there is a sufficient amount of the second set of data 106 the system may communicate the second set of data 110. However, if there is not a sufficient amount of streaming data to communicate 106, the system may communicate the first set of data 108. Data 108 or 110 may be communicated in a variety of ways, including but not limited to aurally, such as an audio communication, tactually, such as a touch response surface to communicate Braille, visually, such as on a video output device, etc. Furthermore, data may be communicated to a user, an information handling system, a storage device, etc. without departing from the spirit and scope of the present invention.

Figure 2:
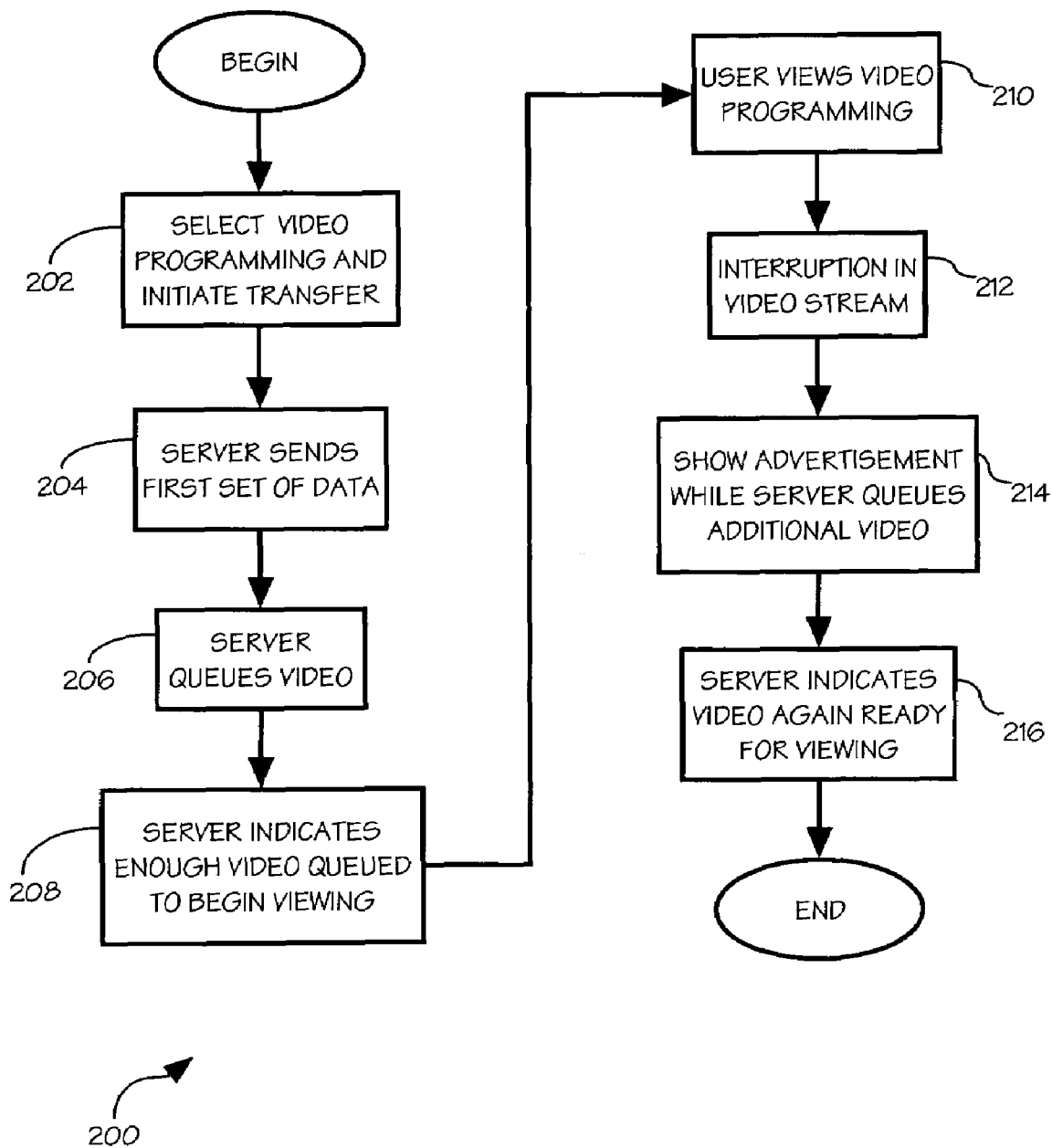
FIG. 2 is a flow chart depicting an exemplary method for viewing streaming data that may include video programming.

As shown in FIG. 2, an exemplary method for communicating streaming data including video programming is shown. It is foreseeable that user's may obtain video programming over a network (that was traditionally shown over broadcast television of a network), such as the Internet, online service provider, World Wide Web, etc. However, problems may arise, resulting in an insufficient amount of data available for communication. Therefore, it may be preferable to disguise the periods wherein sufficient data is not available by the use of another set of data. For example, in an exemplary method 200 of transferring streaming data that includes video programming, a user may select video programming and initiate transfer of the programming 202 to a user's information handling system. A server may send a first set of data 204, in this instance an advertisement, which may be stored on a user's system. The server may then queue video 206. Once enough video is queued to begin viewing, the server may indicate that the user may begin viewing 208. As the user views the video programming 210 the server continues to queue video. However, an interruption in the video stream 212 may result in an insufficient amount of data to be viewed. Therefore, the server shows an advertisement while the server queues additional video 214. Once a sufficient amount of video is queued, the server may indicate that the video is again ready for viewing 216.

Figure 3:
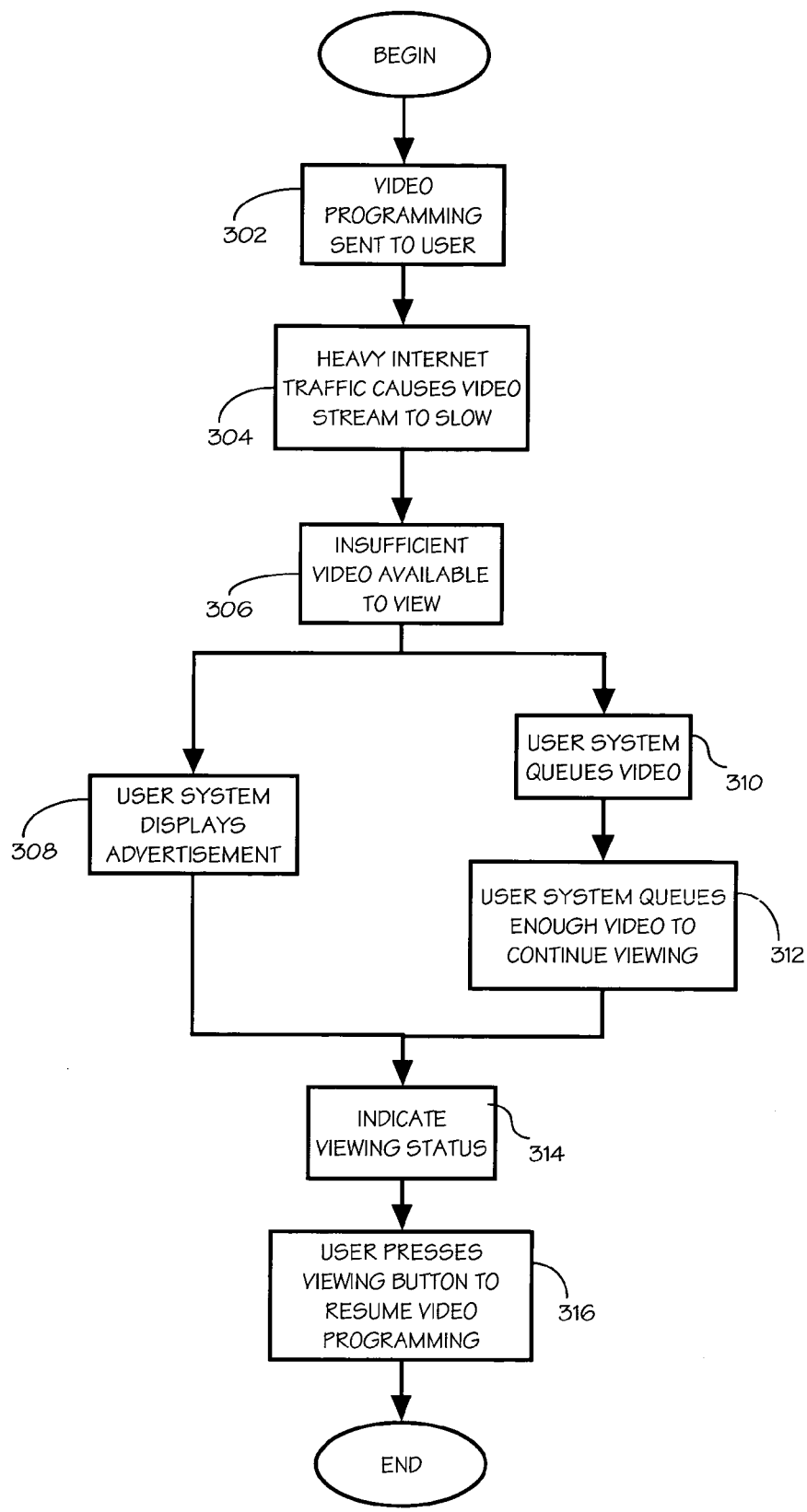
FIG. 3 is a flow chart depicting an exemplary method for communicating streaming data including video programming.

Referring now to FIG. 3, another exemplary method is shown for communicating streaming data including video programming. In this embodiment, video programming is sent to a user 302 over a network, in this case the Internet. During transmission of the data stream, heavy Internet traffic causes the video stream to slow 304. Because of the slow down in transmission, there is insufficient streaming video data available to be communicated to a user 306. Therefore the user system may display another set of data, in this instance an advertisement 308 while the user's system queues video 310 until enough video data is available to continue viewing 312. The system may then indicate to the user the status of the video data stream 314 so that the user may reinitiate viewing of the video programming, for instance by pushing a button 316. Additionally, it should be apparent that the system may automatically resume viewing of the video so as not to require user interaction.

Figure 4:
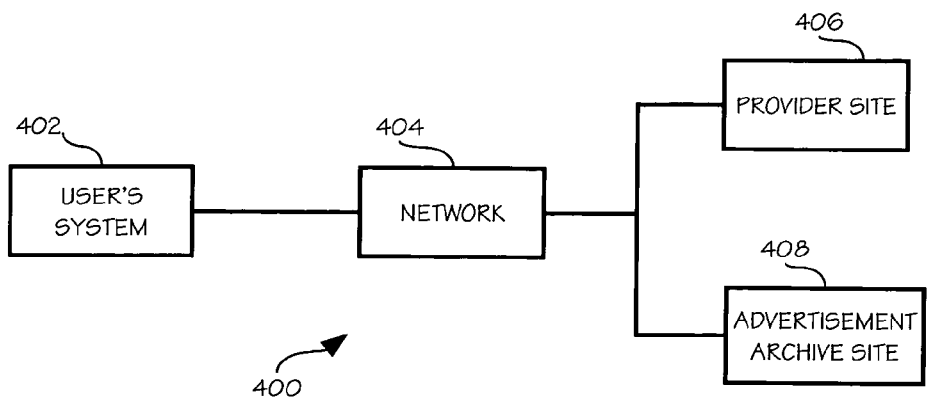
FIG. 4 is an exemplary embodiment depicting a block diagram of an exemplary organizational structure operable to employ the present invention, wherein a first set of data is provided from a first source and a second set of streaming data is provided from a second source over a network to a user.
Figure 5:
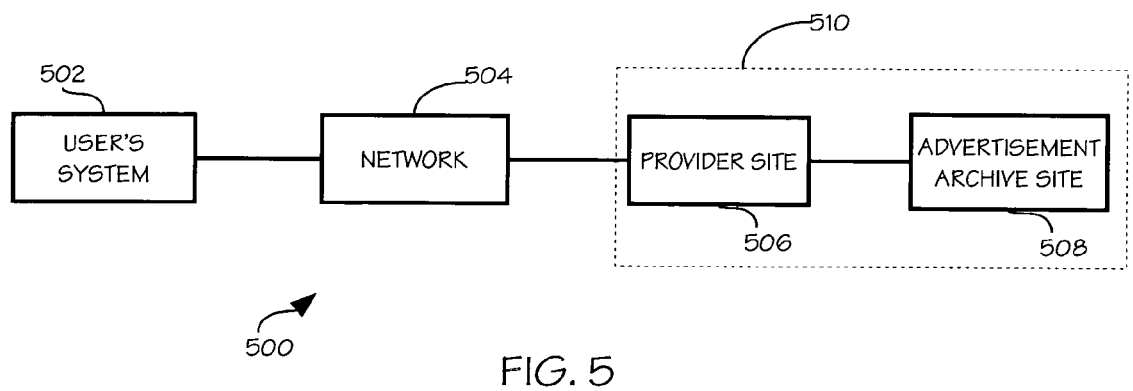
FIG. 5 is an exemplary embodiment depicting a block diagram of an exemplary organizational structure operable to employ the present invention wherein a first set of data and a second set of streaming data are provided from a first source over a network to a user.
Figure 6:
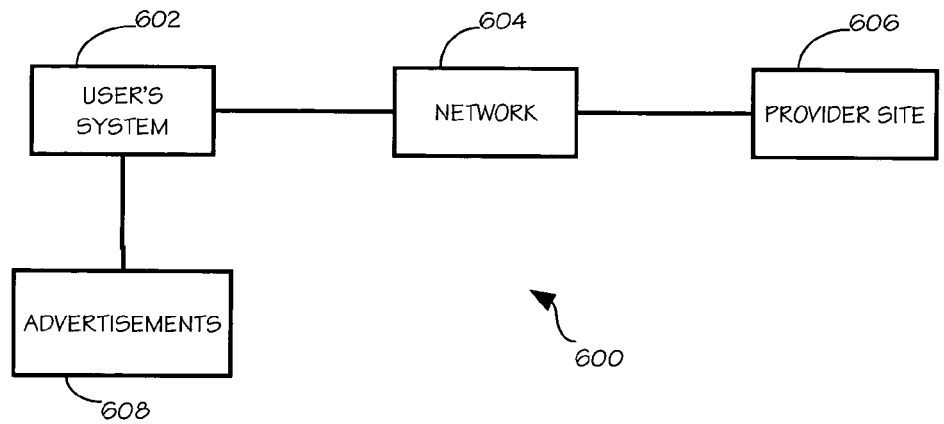
FIG. 6 is an exemplary embodiment depicting a block diagram of an exemplary organizational structure operable to employ the present invention wherein a first set of data is available directly to a user and a second set of streaming data is provided from a first source over a network to a user.

There are a variety of sources from which data may be supplied. Referring now to FIGS. 4-6, block diagrams of exemplary organizational structures of the present invention are shown. In these exemplary embodiments, data communicated during periods of insufficient streaming data may include advertisements. As shown in FIG. 4, a user 402 may obtain data over a network 404, such as the Internet, World Wide Web, local area network (LAN), wide area network (WAN), wireless network, satellite system, etc. Streaming data may be obtained from a provider site 406, and data displayed while insufficient streaming data is available may be obtained from another source, such as an advertisement archive site 408. This source may include a hard drive of a user's system, a floppy disk, random access memory and read only memory, compact disk read only memory, and other sources over a network, such as a file transfer protocol site, web site, satellite provider, online service site, etc. For example, a user may obtain video programming from one site yet receive advertisements from another site.

Additionally, advertisements and streaming data may be obtained from the same source, as shown in FIG. 5. In this embodiment, a user 502 may obtain data over a network 504 from a singular source 510. This source 510 may contain streaming data from a provider site 506 as well as an advertisement archive site 508.

Furthermore, advertisements may be stored and inputted locally on a user's system, as shown in FIG. 6. In this embodiment, a user's system 602 may receive advertisements 608 from a local source, such as a compact disk read only memory (CD-ROM), floppy disk, or any other source as contemplated by a person of ordinary skill in the art. Streaming data may be supplied from a provider site 606 over a network 604 to the user's system 602.

Figure 7:
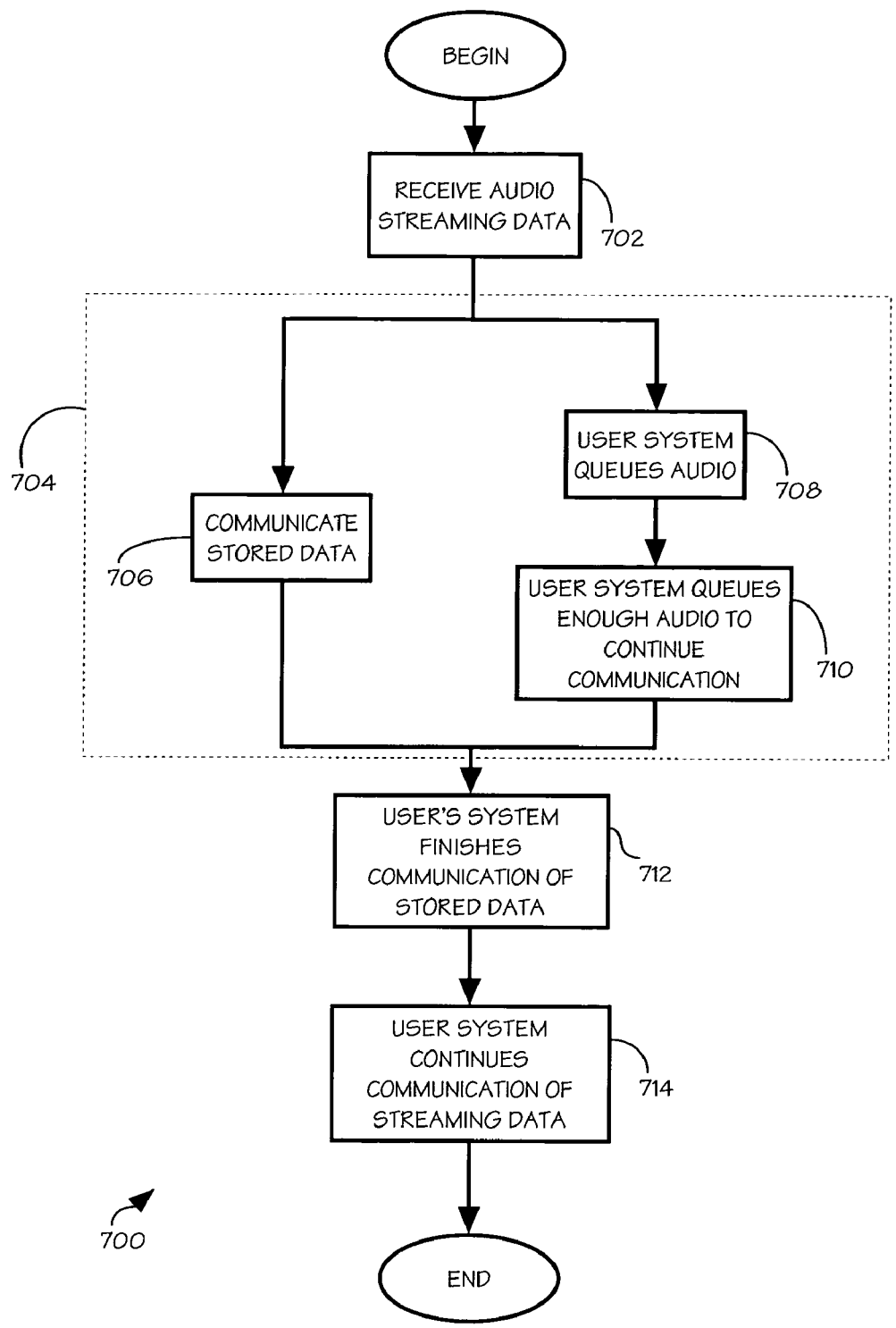
FIG. 7 is a flow chart depicting an exemplary method for communicating streaming data including audio data.

Streaming data may also include audio data, as shown in FIG. 7. In this exemplary method 700, a user may receive audio-streaming data 702 over a wireless broadcast, for instance from a typical radio station. Audio data may be received by an information handling system operable to receive and communicate audio data received over a wireless network. If a user encounters interference wherein insufficient amounts of streaming data are available for communication 704, the user's system may communicate data stored on the system 706. Data may be communicated and stored on the system by information transmitted from the system provider, stored data inputted by the user, etc. While the user's system communicates the stored data 706, the system may continue to queue audio data 708. Once the user's system has queued enough audio data to continue communication 710, the user's system may finish communication of the stored data 712 and continue communication of the streaming data 714.

Figure 8:
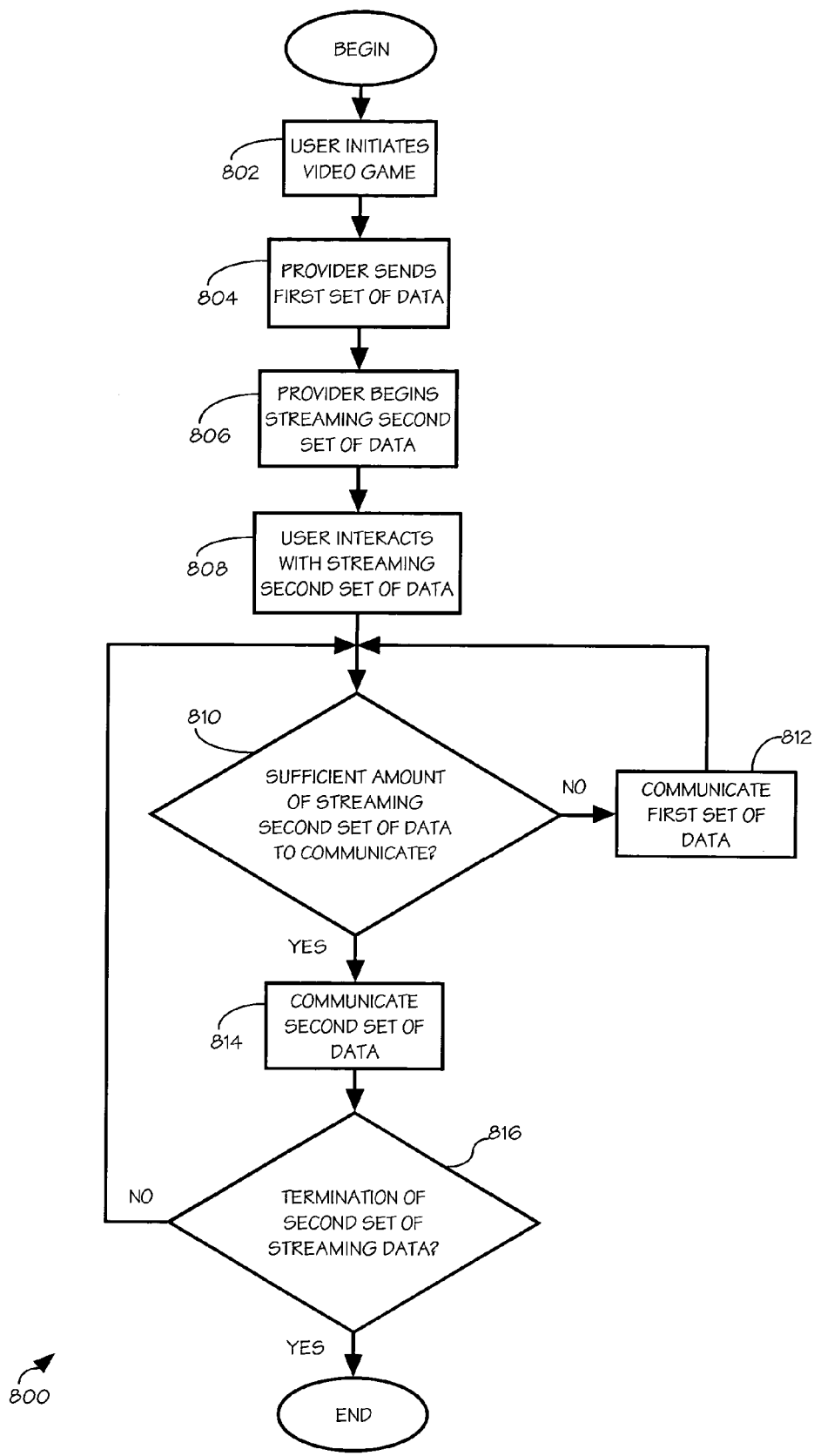
FIG. 8 is a flow chart depicting an exemplary method for communicating streaming data including video gaming data wherein the method may reinitiate communication of another set of data due to an insufficient amount of streaming data.

Additionally, it may be preferable to employ the present invention with an interactive data stream, an example of which is shown in FIG. 8. In this exemplary method, a user may interact with a data stream, in this instance a video game. First a user initiates a video game 802. Video games may be stored in provider sites over a network that may be accessed by a user, examples of which are shown in FIGS. 4-6. After a user initiates a video game 802, a provider may send a first set of data 804. This first set of data may contain advertisements, user information, previews, etc. Then, the provider may begin streaming a second set of user data 806. As the user interacts with the streaming second set of data 808, the system may determine if a sufficient amount of the streaming second set of data is available to communicate 810. If there is not a sufficient amount, the first set of data is communicated to the user 812. If there is a sufficient amount of data, the streaming second set of data 814 may be communicated. Interaction with the streaming second set of data or first set of data may continue until the streaming second set of data is terminated 816.

Figure 9:
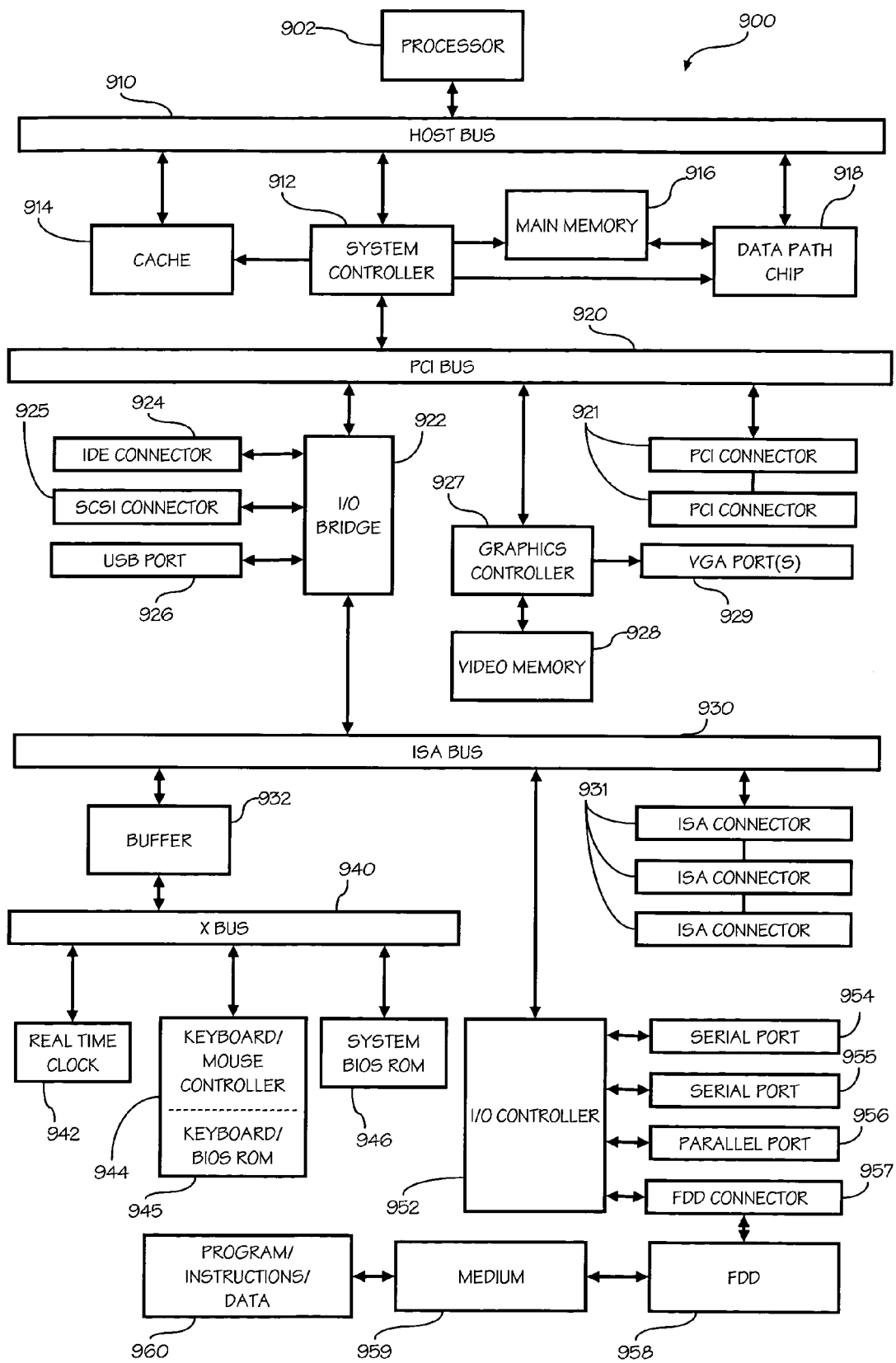
FIG. 9 is a block diagram depicting an exemplary information handling system operable to embody the present invention.

Referring now to FIG. 9, a block diagram of an exemplary information handling system 900 according to the present invention is shown. In this embodiment, processor 902, system controller 912, cache 914, and data-path chip 918 are each coupled to host bus 910. Processor 902 is a microprocessor such as a 486-type chip, a Pentium®, Pentium II®, Pentium III® or other suitable microprocessor. Cache 914 provides high-speed local-memory data (in one embodiment, for example, 512 KB of data) for processor 902, and is controlled by system controller 912, which loads cache 914 with data that is expected to be used soon after the data is placed in cache 914 (i.e., in the near future). Main memory 916 is coupled between system controller 912 and data-path chip 918, and in one embodiment, provides random-access memory of between 16 MB and 128 MB of data. In one embodiment, main memory 916 is provided on SIMMS (Single In-line Memory Modules), while in another embodiment, main memory 916 is provided on DIMMs (Dual In-line Memory Modules), each of which plugs into suitable sockets provided on a motherboard holding many of the other components shown in FIG. 9. Main memory 916 includes standard DRAM (Dynamic Random-Access Memory), EDO (Extended Data Out) DRAM, SDRAM (Synchronous DRAM), or other suitable memory technology. System controller 912 controls PCI (Peripheral Component Interconnect) bus 920, a local bus for system 900 that provides a high-speed data path between processor 902 and various peripheral devices, such as video, disk, network, etc. Data-path chip 918 is also controlled by system controller 912 to assist in routing data between main memory 916, host bus 910, and PCI bus 920.

In one embodiment, PCI bus 920 provides a 32-bit-wide data path that runs at 33 MHz. In another embodiment, PCI bus 920 provides a 64-bit-wide data path that runs at 33 MHz. In yet other embodiments, PCI bus 920 provides 32-bit-wide or 64-bit-wide data paths that runs at higher speeds. In one embodiment, PCI bus 920 provides connectivity to I/O bridge 922, graphics controller 927, and one or more PCI connectors 921, each of which accepts a standard PCI card. In one embodiment, I/O bridge 922 and graphics controller 927 are each integrated on the motherboard along with system controller 912, in order to avoid a board-connector-board signal-crossing interface and thus provide better speed and reliability. In the embodiment shown, graphics controller 927 is coupled to a video memory 928 (that includes memory such as DRAM, EDO DRAM, SDRAM, or VRAM (Video Random-Access Memory)), and drives VGA (Video Graphics Adapter) port 929. VGA port 929 can connect to VGA-type or SVGA (Super VGA)-type displays. Other input/output (I/O) cards having a PCI interface can be plugged into PCI connectors 921.

In one embodiment, I/O bridge 922 is a chip that provides connection and control to one or more independent connectors 924-925, to a USB (Universal Serial Bus) port 926, and to ISA (Industry Standard Architecture) bus 930. In this embodiment, IDE connector 924 provides connectivity to a standard IDE-type device such as a hard disk drive, CDROM (Compact Disk-Read-Only Memory) drive, DVD (Digital Video Disk) drive, or TBU (Tape-Backup Unit) device. In one similar embodiment, an IDE connector 924 provides the EIDE (Enhanced IDE) architecture. In the embodiment shown, SCSI (Small Computer System Interface) connector 925 provides connectivity for up to seven or fifteen SCSI-type devices (depending on the version of SCSI supported by the embodiment). In one embodiment, I/O bridge 922 provides ISA bus 930 having one or more ISA connectors 931 (in one embodiment, three connectors are provided). In one embodiment, ISA bus 930 is coupled to I/O controller 952, which in turn provides connections to two serial ports 954 and 955, parallel port 956, and FDD (Floppy-Disk Drive) connector 957. In one embodiment, FDD connector 957 is connected to FDD 958 that receives removable media (floppy diskette) 959 on which is stored data and/or program code 960. In one such embodiment, program code 960 includes code that controls programmable system 900 to perform the method described below. In another such embodiment, serial port 954 is connectable to a computer network such as the Internet, and such network has program code 960 that controls programmable system 900 to perform the method described below. In one embodiment, ISA bus 930 is connected to buffer 932, which is connected to X bus 940, which provides connections to real-time clock 942, keyboard/mouse controller 944 and keyboard BIOS ROM (Basic Input/Output System Read-Only Memory) 945, and to system BIOS ROM 946.

FIG. 9 shows one exemplary embodiment of the present invention, however other bus structures and memory arrangements are specifically contemplated.

In one embodiment, I/O bridge 922 is a chip that provides connection and control to one or more independent IDE connectors 924, to a USB (Universal Serial Bus) port 926, and to ISA (Industry Standard Architecture) bus 930. In this embodiment, IDE connector 924 provides connectivity to a standard IDE-type device such as a hard disk drive or CD-ROM (Compact Disk-Read-Only Memory) drive, and similarly, a second IDE connector (not shown) provides connectivity for up to two IDE-type devices. In one such embodiment, IDE connector 924 provides the EIDE (Enhanced IDE) architecture. In one embodiment, I/O bridge 922 provides ISA bus 930 having one or more ISA connectors 931 (in one embodiment, three connectors are provided). In one embodiment, ISA bus 930 is coupled to I/O controller 952, which in turn provides connections to two serial ports 954 and 955, parallel port 956, and FDD (Floppy-Disk Drive) connector 957. In one embodiment, ISA bus 930 is connected to buffer 932, which is connected to X bus 940, which provides connections to real-time clock 942, keyboard/mouse controller 944 and keyboard BIOS ROM (Basic Input/Output System Read-Only Memory) 945, and to system BIOS ROM 946.

Although the invention has been described with a certain degree of particularity, it should be recognized that elements thereof may be altered by persons skilled in the art without departing from the spirit and scope of the invention. One of the embodiments of the invention can be implemented as sets of instructions resident in the main memory 916 of one or more information handling systems configured generally as described in FIG. 9. Until required by the information handling system, the set of instructions may be stored in another readable memory device, for example in a hard disk drive or in a removable memory such as an optical disk for utilization in a CD-ROM drive, a floppy disk for utilization in a floppy disk drive, a floptical disk for utilization in a floptical drive, or a personal computer memory card for utilization in a personal computer card slot. Further, the set of instructions can be stored in the memory of another information handling system and transmitted over a local area network or a wide area network, such as the Internet, when desired by the user. Additionally, the instructions may be transmitted over a network in the form of an applet that is interpreted or compiled after transmission to the computer system rather than prior to transmission. One skilled in the art would appreciate that the physical storage of the sets of instructions or applets physically changes the medium upon which it is stored electrically, magnetically, chemically, physically, optically or holographically so that the medium carries computer readable information.

It is believed that the system and method for communicating streaming data and many of its attendant advantages will be understood by the forgoing description, and it will be apparent that various changes may be made in the form, construction and arrangement of the components thereof without departing from the scope and spirit of the invention or without sacrificing all of its material advantages, the form herein before described being merely an explanatory embodiment thereof. It is the intention of the following claims to encompass and include such changes.

What is claimed is:

1. A method for communicating streaming data, comprising the steps of:
   providing a first set of data;
   storing the first set of data locally;
   providing a second set of data via a network wherein the second set of data is an interactive streaming data set;
   enabling communication of the second set of data so long as a sufficient amount of interactive streaming data of the second set of data is available for communication;
   in the event there is not a sufficient amount of interactive streaming data of the second set of data available, enabling communication of the locally stored first set of data; and
   after communication of the locally stored first set of data, determining that a sufficient amount of the second set of data is available for communicating, indicating to a user that communication of the second set of data may continue.

2. The method as described in claim 1, wherein the second set of data includes a video stream viewable by a user.

3. The method as described in claim 1, wherein the first set of data and the second set of data are transmitted from a first source.

4. The method as described in claim 3, wherein the first set of data is made available for communication when there is an insufficient amount of streaming data of the second set of data for communication.

5. The method as described in claim 1, wherein the first set of data is provided from a first source and the second set of data is provided from a second source.

6. The method as described in claim 5, wherein the first source consists of at least one of the following: a hard drive, a floppy disk, a random access memory (RAM), a read-only memory (ROM), a compact disk read only memory (CD-ROM), a file transfer protocol site, a web site, a satellite provider or an online service site.

7. The method as described in claim 1, wherein while the first set of data is being communicated due to an insufficient amount of streaming data of the second set of data, monitoring the second set of data to determine if a sufficient amount of streaming data is available for communication.

8. The method as described in claim 7, wherein the user may manually enable communication of the second set of data when a sufficient amount of streaming data of the second set of data is available.

9. The method as described in claim 1, wherein a reason for an insufficient amount of streaming data of the second set of data being available consists of at least one of the following: high Internet traffic, slow transmission rates, insufficient processing resources, interference with a connection between a user system and a provider system, termination of a connection between a user system and a provider system, or lowered throughput.

10. The method as described in claim 1, wherein the network consists of at least one of the following: a local area network (LAN), a wide area network (WAN), an online service, an Internet server, a satellite system, a wireless system, or a World Wide Web server.

11. The method as described in claim 1, wherein the interactive streaming data set is a video game.

12. A computer readable medium containing program instructions which when executed by an information handling system causes the information handling system to perform the steps of:
   providing a first set of data, the first set of data stored locally;
   providing a second set of data via a network wherein the second set of data is an interactive streaming data set;
   enabling communication of the second set of data so long as a sufficient amount of interactive streaming data of the second set of data is available for;

in the event there is not a sufficient amount of interactive streaming data of the second set of data available, enabling communication of the locally stored first set of data; and after communication of the locally stored first set of data, determining that a sufficient amount of the second set of data is available for communicating, indicating to a user that communication of the second set of data may continue.

13. The program of instructions as described in claim 12, wherein the second set of data includes a video stream viewable by a user.

14. The program of instructions as described in claim 12, wherein the first set of data and the second set of data are transmitted from a first source.

15. The program of instructions as described in claim 14, wherein the first set of data is made available for communication when there is an insufficient amount of streaming data of the second set of data for communication.

16. The program of instructions as described in claim 12, wherein the first set of data is provided from a first source and the second set of data is provided from a second source.

17. The program of instructions as described in claim 16, wherein the first source consists of at least one of the following: a hard drive, a floppy disk, a random access memory (RAM), a read-only memory (ROM), a compact disk read only memory (CD-ROM), a file transfer protocol site, a web site, a satellite provider, or an online service site.

18. The program of instructions as described in claim 12, wherein while the first set of data is communicated due to an insufficient amount of streaming data of the second set of data, monitoring the second set of data to determine if a sufficient amount of streaming data is available for communication.

19. The program of instructions as described in claim 18, wherein the user may manually enable communication of the second set of data when a sufficient amount of streaming data of the second set of data is available.

20. The program of instructions as described in claim 12, wherein a reason for an insufficient amount of streaming data of the second set of data being available consists of at least one of the following: high Internet traffic, slow transmission rates, insufficient processing resources, interference with a connection between a user system and a provider system, termination of a connection between a user system and a provider system, or lowered throughput.

21. The program of instructions as described in claim 12, wherein the network consists of at least one of the following: a local area network (LAN), a wide area network (WAN), an online service, an Internet server, a satellite system, a wireless system, or a World Wide Web server.

22. The program of instructions as described in claim 12, wherein the interactive streaming data set is a video game.

23. An information handling system comprising:
a processor for executing a program of instructions on the information handling system;
a memory coupled to the processor for storing the program of instructions executable by said processor;
an input and output system coupled to the processor for coupling the information handling system to a network;
the program of instructions capable of configuring the information handling system to perform the following steps:
providing a first set of data;
storing the first set of data locally;
providing a second set of data via a network wherein the second set of data is an interactive streaming data set;
enabling communication of the second set of data so long as a sufficient amount of interactive streaming data of the second set of data is available for;
in the event there is not a sufficient amount of interactive streaming data of the second set of data available, enabling communication of the locally stored first set of data; and
after communication of the locally stored first set of data, determining that a sufficient amount of the second set of data is available for communicating, indicating to a user that communication of the second set of data may continue.

24. The information handling system as described in claim 23, wherein the second set of data includes a video stream viewable by a user.

25. The information handling system as described in claim 23, wherein the first set of data and the second set of data are transmitted from a first source.

26. The information handling system as described in claim 25, wherein the first set of data is made available for communication when there is an insufficient amount of streaming data of the second set of data for communication.

27. The information handling system as described in claim 23, wherein the first set of data is provided from a first source and the second set of data is provided from a second source.

28. The information handling system as described in claim 27, wherein the first source consists of at least one of the following: a hard drive, a floppy disk, a random access memory (RAM), a read-only memory (ROM), a compact disk read only memory (CD-ROM), a file transfer protocol site, a web site, a node, a satellite provider, or an online service site.

29. The information handling system as described in claim 23, wherein while the first set of data is communicated due to an insufficient amount of streaming data of the second set of data, monitoring the second set of data to determine if a sufficient amount of streaming data is available for communication.

30. The information handling system as described in claim 29, wherein the user may manually enable communication of the second set of data when a sufficient amount of streaming data of the second set of data is available.

31. The information handling system as described in claim 23, wherein a reason for an insufficient amount of streaming data of the second set of data being available consists of at least one of the following: high Internet traffic, slow transmission rates, insufficient processing resources, interference with a connection between a user system and a provider system, termination of a connection between a user system and a provider system, or lowered throughput.

32. The information handling system as described in claim 23, wherein the network consists of at least one of the following: a local area network (LAN), a wide area network (WAN), an online service, an Internet server, a satellite system, a wireless system, or a World Wide Web server.

33. The information handling system as described in claim 23, wherein the interactive streaming data set is a video game.

34. An information handling system comprising:
means for executing a program of instructions on the information handling system;
means, coupled to said executing means, for storing a program of instructions executable by said executing means;
means, coupled to said executing means, for coupling the information handling system to a network;
the program of instructions capable of configuring the information handling system to perform the following steps:

providing a first set of data;

providing a second set of data via a network wherein the second set of data is an interactive streaming data set;

enabling communication of the second set of data so long as a sufficient amount of interactive streaming data of the second set of data is available for;

in the event there is not a sufficient amount of interactive streaming data of the second set of data available, enabling communication of the locally stored first set of data; and after communication of the locally stored first set of data, determining that a sufficient amount of the second set of data is available for communicating, indicating to a user that communication of the second set of data may continue.

35. The information handling system as described in claim 34, wherein the first set of data is made available for communication when there is an insufficient amount of streaming data of the second set of data for communication.

36. The information handling system as described in claim 34, wherein while the first set of data is communicated due to an insufficient amount of streaming data of the second set of data, monitoring the second set of data to determine if a sufficient amount of streaming data is available for communication.

37. The information handling system as described in claim 34, wherein the interactive streaming data set is a video game.

38. A method for playing a video game, comprising the steps of:

initiating a video game by a user;

providing a first set of data from a first source;

storing the first set of data locally;

providing a second set of data from a second source via a network wherein the second set of data is an interactive streaming data set;

interaction by the user with the interactive streaming data set;

enabling communication of the second set of data so long as a sufficient amount of interactive streaming data of the second set of data is available for communication;

in the event there is not a sufficient amount of interactive streaming data of the second set of data available, enabling communication of the locally stored first set of data; and after communication of the locally stored first set of data, determining that a sufficient amount of the second set of data is available for communicating, indicating to a user that communication of the second set of data may continue.

39. The method of claim 38, wherein the first source of the first data set is different than the second source of the second data set.

* * * * *